(No Model.)
2 Sheets—Sheet 1.
H. F. HICKS.
HARVESTER CUTTER.
No. 263,409.  Patented Aug. 29, 1882.
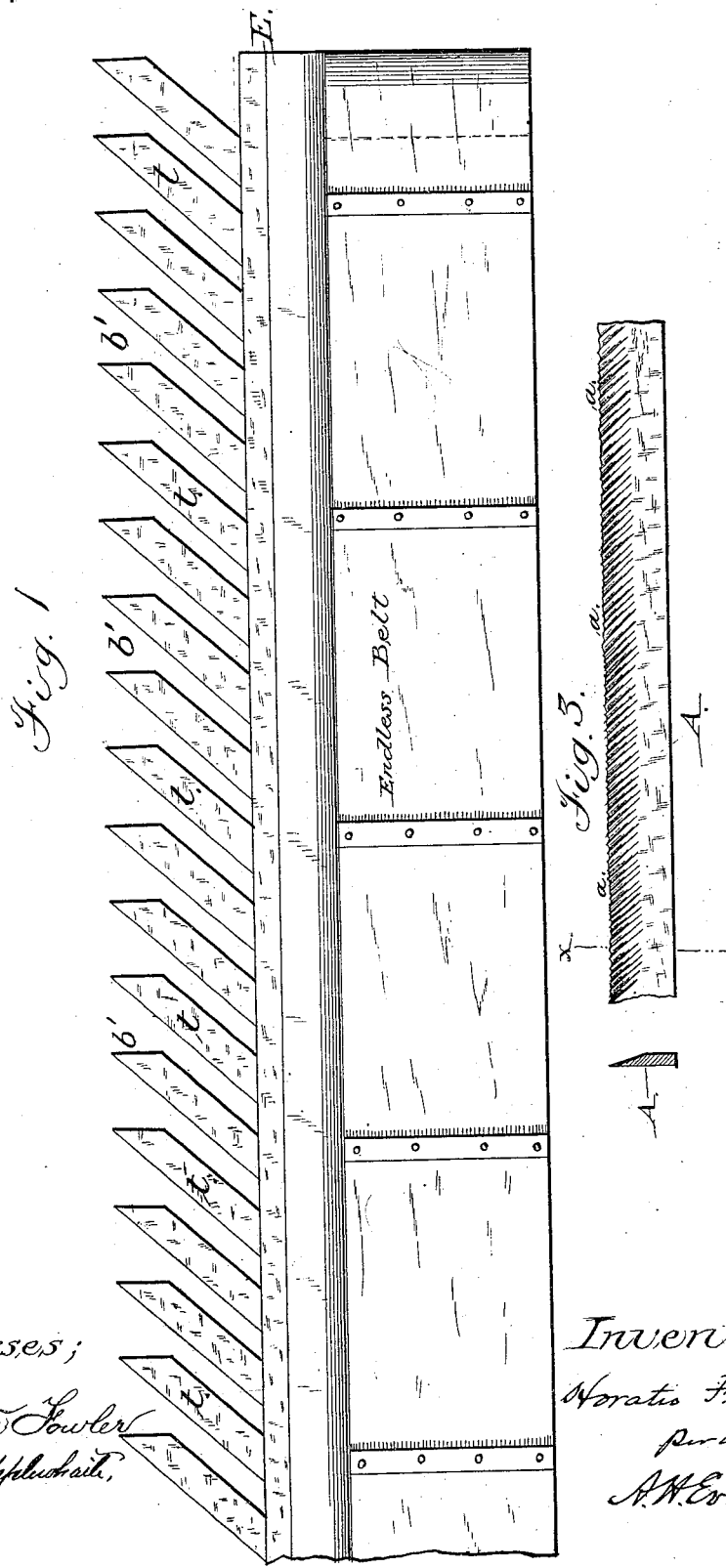

(No Model.)  2 Sheets—Sheet 2.
H. F. HICKS.
HARVESTER CUTTER.
No. 263,409.  Patented Aug. 29, 1882.
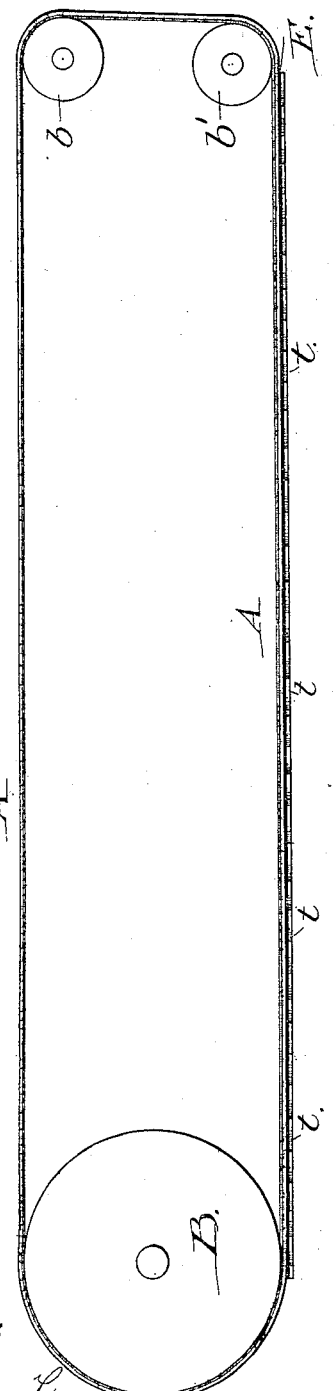
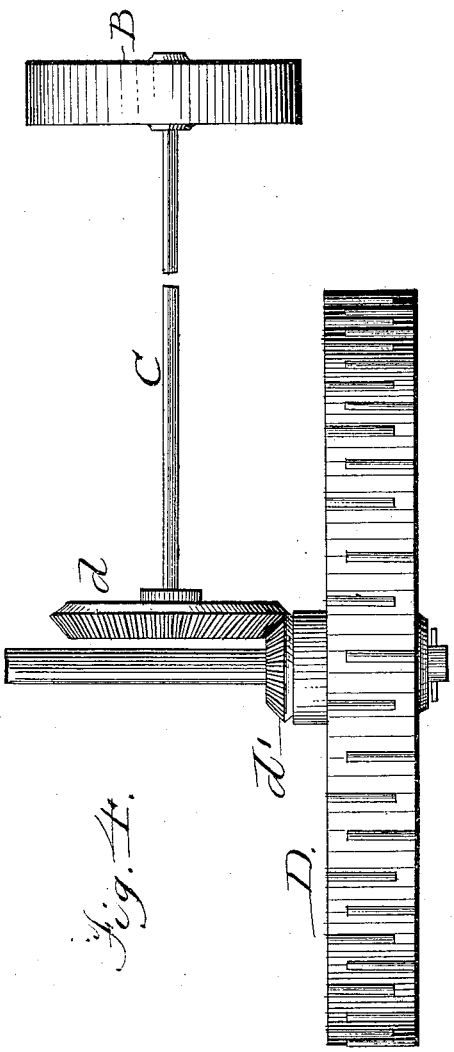
Witnesses:
Walter Fowler
H. B. Applewhaite
Inventor:
Horatio F. Hicks
per attys.
A. H. Evans & Co.

UNITED STATES PATENT OFFICE.

HORATIO F. HICKS, OF MINNEAPOLIS, MINNESOTA.

HARVESTER-CUTTER.

SPECIFICATION forming part of Letters Patent No. 263,409, dated August 29, 1882.

Application filed May 16, 1882. (No model.)

*To all whom it may concern:*

Be it known that I, HORATIO F. HICKS, of Minneapolis, in the county of Hennepin and State of Minnesota, have invented certain Improvements in Harvester-Cutters; and I hereby declare the following to be a full, clear, and exact description thereof, reference being had to the accompanying drawings, making part of this specification, in which—

Figure 1 is a plan of the finger-bar and belt. Fig. 2 is a front elevation of the cutting apparatus. Fig. 3 is a view of a portion of the sickle. Fig. 4 illustrates the mode of gearing the sickle.

My invention consists in a peculiar form of finger in the finger-bar, all of which will be hereinafter fully described and claimed.

My invention also consists of the said finger-bar, of the peculiar construction hereinafter described, in combination with an endless band sickle provided with a prepared cutting-edge.

In order that those skilled in the art may make and use my invention, I will proceed to describe the manner in which I have carried it out.

In the said drawings, A represents an endless metal cutting-sickle having a prepared cutting-edge, serrated, as seen at *a a*, by means of diagonal cuts with a file or other medium. This endless band cutter I mount or suspend on one large driving-pulley, B, and two smaller pulleys, *b b'*, the smaller pulleys being next to the end of the harvester designed to be run adjacent to the grain, so as to bring the commencement of the cut as squarely as possible in a line with the end of the finger-bar. The driving-pulley B is mounted on a shaft, C, which passes toward the axle of the supporting-wheels of the harvester, and is provided with a bevel-gear wheel, *d*, which meshes with a bevel-gear wheel, *d'*, on the hub of the supporting and traction wheel D, and through these means the endless metal sickle A is kept continuously moving across the finger-bar, and thereby cuts the grain.

The finger-bar E is provided with a series of fingers or teeth, *t t*, which rake in a direction opposite the direction of the travel of the sickle A, the sides of the fingers or teeth being parallel and their ends sheared at *b''* in lines at right angles to the sickle, and the inner ends of the spaces between said teeth cut in a line parallel to the finger-bar proper.

It will be observed that the file-cuts on the beveled edge of the sickle forming the serrations are diagonal to the edge, and in mounting the sickle it is arranged so that in its travel the diagonal lines of the file-cuts pass in or almost in right angles to the lines of the sides of the teeth or fingers of the finger-bar. By this means the straw is crowded into the remotest corner of the space between the teeth and only in small quantities and is cut by a draw cut.

I am aware that various kinds of band-sickles have been made by the joining of many teeth together by pivots and other means, after the manner of endless chains.

I am also aware that an endless band-sickle is not broadly new, such a sickle having been heretofore used and drawn through an endless guiding-sleeve by proper gearing; but such construction, with the guiding-sleeve, adds materially to the weight of the machine.

I am also aware that a serrated cutting-edge prepared in the manner described by me is not new.

Having thus described my invention, what I claim as new, and desire to secure by Letters Patent, is—

1. The bar E, provided with the fingers or guards *t t*, projecting therefrom at an acute angle, and having their front ends, *b''*, sheared off to form an edge at right angles to the bar, and being freely separated from each other at their bases or junction with the bar, whereby the cutting is accomplished within the open spaces between the fingers, as set forth.

2. The bar E, provided with the fingers or guards *t t*, projecting therefrom at an acute angle, and having their front ends, *b''*, sheared off to form an edge at right angles to the bar, and being freely separated at their bases or junction with the bar, in combination with an endless band-sickle having a prepared cutting-edge and mounted on pulleys B *b b'*, substantially as described.

HORATIO F. HICKS.

Witnesses:
H. B. APPLEWHAITE,
E J. REDMOND.